(No Model.)
E. J. HAGAN.
THILL FOR VEHICLES.
No. 397,357. Patented Feb. 5, 1889.
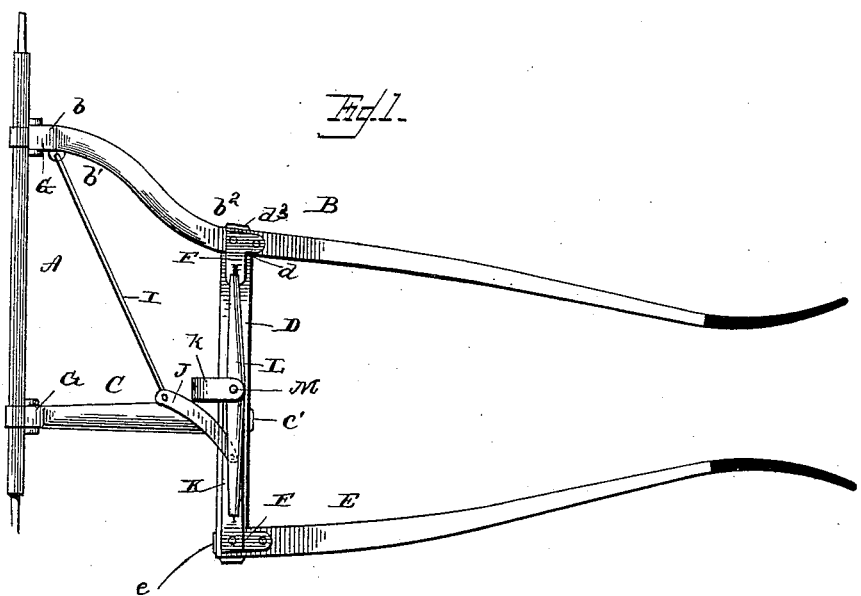
Fig. 1.
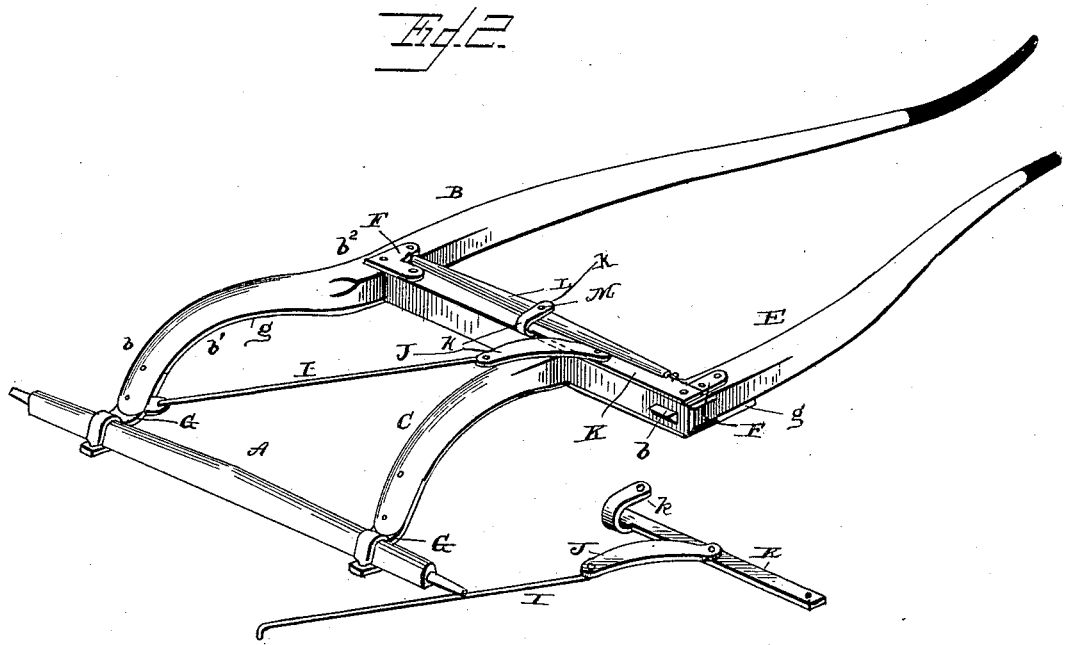
Fig. 2.
Fig. 3.
WITNESSES.
F. L. Durand
Benj. G. Cowl
INVENTOR.
Elijah J. Hagan,
by Louis Baggett
Attorney
N. PETERS, Photo-Lithographer, Washington, D. C.

UNITED STATES PATENT OFFICE.

ELIJAH J. HAGAN, OF BAYARD, IOWA.

THILL FOR VEHICLES.

SPECIFICATION forming part of Letters Patent No. 397,357, dated February 5, 1889.

Application filed August 18, 1888. Serial No. 283,066. (No model.)

*To all whom it may concern:*

Be it known that I, ELIJAH J. HAGAN, a citizen of the United States, and a resident of Bayard, in the county of Guthrie and State of Iowa, have invented certain new and useful Improvements in Thills; and I do hereby declare that the following is a full, clear, and exact description of the invention, which will enable others skilled in the art to which it appertains to make and use the same, reference being had to the accompanying drawings, which form a part of this specification, and in which—

Figure 1 is a top plan view of the forward axle of a vehicle, showing my improved thills secured in operative position thereto; and Fig. 2 is a perspective view of the same. Fig. 3 is a detail view of the equalizer.

Similar letters of reference denote corresponding parts in all the figures.

The object of my invention is to construct thills for vehicles which will enable the horse to travel in the track made by the wheels of the vehicles; furthermore, to use in connection with these thills a brace which will cause the line of draft to be at the center of the vehicle, or approximately so; furthermore, to provide means whereby the singletree is rendered yieldable at its point of attachment to cross-bar of the thills, and, finally, to construct a device which shall be simple of construction, durable in use, and exceedingly inexpensive of production.

With these objects in view, the invention consists in the improved construction and combination of parts of the same, as will be hereinafter fully described, and set forth in the claim.

In the accompanying drawings, A denotes the forward axle of the vehicle. B denotes one of the thills, pivoted to the axle in the usual manner at $b$. This thill is formed with the compound curve $b'$ $b^2$, the curve $b^2$ extending forward and forming the main longitudinal portion of the thill. Pivoted to the opposite end of the axle is the curved heel C. A cross-bar, D, is secured at one end to the shaft B at $d$, and is formed near its opposite end with an aperture, through which the tenon $c'$ of the heel C projects. To the end of this cross-piece, which is beyond the heel C, and which is formed with another aperture, fits the tenon $e$ of the thill E. Metallic corner-stays F are bolted to these parts where they are connected. The cross-bar is provided with a tenon, $d^3$, which fits in a socket, $b^2$, of the first-mentioned thill.

The thill-irons G are extended forward and have lateral extensions $g$, which are bolted to the under sides of the thills and the cross-bar, and serve to brace or strengthen the connected parts. An apertured lip is secured to and projects from the under side of the thill B, and to which is hooked the end of a brace-rod, I, which extends diagonally across and is hooked to a link, J, which is pivoted to the equalizing-lever K at its intermediate portion. This lever is pivoted at one end to one of the thills E, and is formed at its other end with a curved loop, $k$, in which loop is secured the singletree L by a pivotal bolt, M.

When the horse is harnessed to the singletree, which is free to turn upon its bolt, a yielding motion is imparted to the animal when starting, thus obviating the great drawback heretofore experienced. At the same time the line of draft is brought at the center of the axle, thus preventing the vehicle running to one side.

From the foregoing description, taken in connection with the accompanying drawings, the operation and advantages of my invention will be readily seen without requiring an extended explanation. It will be observed that by forming the thill B with the compound curve sharp angles are avoided, and consequently the vehicle may be easily removed from the stable without catching into beams and other objects.

Having thus described my invention, I claim and desire to secure by Letters Patent of the United States—

The combination of the curved thill, the cross-piece, the curved heel secured to the cross-piece at a point near its center, the equalizing-lever having one end pivoted to the cross-piece and at its other end formed into a loop, a singletree pivoted in the said lever, a link pivoted to the lever at a point intermediate its length, and a brace-rod secured to the link and to a lip on the curved thill, substantially as and for the purpose described.

In testimony that I claim the foregoing as my own I have hereunto affixed my signature in presence of two witnesses.

ELIJAH J. HAGAN.

Witnesses:
J. LYNCH,
DANIEL VADER.